(12) United States Patent
Park et al.

(10) Patent No.: US 11,619,649 B1
(45) Date of Patent: Apr. 4, 2023

(54) ATOMIC FORCE MICROSCOPE EQUIPPED WITH OPTICAL MEASUREMENT DEVICE AND METHOD OF ACQUIRING INFORMATION ON SURFACE OF MEASUREMENT TARGET USING THE SAME

(71) Applicant: PARK SYSTEMS CORP., Suwon-si (KR)

(72) Inventors: Sang-il Park, Suwon-si (KR);
Byoung-Woon Ahn, Suwon-si (KR);
Seung-Ho Han, Seoul (KR);
Sang-Joon Cho, Suwon-si (KR)

(73) Assignee: PARK SYSTEMS CORP., Suwon-si (KR)

( * ) Notice: Subject to any disclaimer, the term of this patent is extended or adjusted under 35 U.S.C. 154(b) by 0 days.

(21) Appl. No.: 17/535,695

(22) Filed: Nov. 26, 2021

(51) Int. Cl.
*G01Q 30/02* (2010.01)
*G01Q 10/04* (2010.01)
*G01Q 60/40* (2010.01)

(52) U.S. Cl.
CPC ............. *G01Q 30/02* (2013.01); *G01Q 10/04* (2013.01); *G01Q 60/40* (2013.01)

(58) Field of Classification Search
CPC ......... G01Q 30/02; G01Q 10/04; G01Q 60/40
USPC ............................ 850/1, 2, 3, 4, 5, 6, 7, 8, 9
See application file for complete search history.

(56) References Cited

U.S. PATENT DOCUMENTS

| | | | | |
|---|---|---|---|---|
| 5,567,872 A | * | 10/1996 | Kyogaku | ............... B82Y 35/00 73/105 |
| 5,650,614 A | * | 7/1997 | Yasutake | ............... G01Q 30/025 977/869 |
| 6,435,015 B1 | * | 8/2002 | Yamamoto | ............. G01Q 70/02 977/869 |
| 7,397,030 B1 | | 7/2008 | Balooch et al. | |
| 8,887,311 B1 | * | 11/2014 | Kirishima | ............... G01Q 20/02 850/8 |
| 2002/0090744 A1 | | 7/2002 | Brill et al. | |
| 2003/0168594 A1 | | 9/2003 | Muckenhirn | |
| 2009/0249520 A1 | | 10/2009 | Anderson | |

(Continued)

FOREIGN PATENT DOCUMENTS

| JP | 2001-241940 A | 9/2001 |
|---|---|---|
| JP | 2003-294436 A | 10/2003 |

(Continued)

*Primary Examiner* — Nicole M Ippolito
(74) *Attorney, Agent, or Firm* — Invenstone Patent, LLC

(57) ABSTRACT

An atomic force microscope equipped with an optical measurement device is disclosed. An atomic force microscope equipped with an optical measurement device which acquires characteristics of a surface of a measurement target by moving a probe along the surface of the measurement target while scanning the measurement target on an XY plane using an XY scanner for supporting the measurement target, includes: an optical measurement device including a lighting unit configured to allow light to enter the surface of the measurement target, and a detection unit configured to detect light reflected by the surface of the measurement target, the optical measurement device being configured to acquire the characteristics of the surface of the measurement target by the scanning by the XY scanner; and a control device configured to control an operation of the atomic force microscope and an operation of the optical measurement device.

12 Claims, 11 Drawing Sheets

(56) References Cited

U.S. PATENT DOCUMENTS

| | | | |
|---|---|---|---|
| 2010/0306884 A1* | 12/2010 | Massie | G01Q 30/025 850/1 |
| 2010/0321693 A1 | 12/2010 | Cho et al. | |
| 2018/0180642 A1 | 6/2018 | Shetty et al. | |

FOREIGN PATENT DOCUMENTS

| | | |
|---|---|---|
| JP | 2006-071534 A | 3/2006 |
| JP | 2006-072081 A | 3/2006 |
| JP | 2010-078584 A | 4/2010 |
| JP | 2020-511646 A | 4/2020 |
| KR | 10-0523031 B1 | 10/2005 |
| KR | 10-0646441 B1 | 11/2006 |
| KR | 10-2009-0051031 A | 5/2009 |
| KR | 10-2013-0047731 A | 5/2013 |
| KR | 10-1468061 B1 | 12/2014 |
| KR | 10-1476808 B1 | 12/2014 |
| KR | 10-2017-0085582 A | 7/2017 |
| WO | 2013-132734 A | 9/2013 |

\* cited by examiner

ATOMIC FORCE MICROSCOPE EQUIPPED WITH OPTICAL MEASUREMENT DEVICE AND METHOD OF ACQUIRING INFORMATION ON SURFACE OF MEASUREMENT TARGET USING THE SAME

BACKGROUND

Field

The present disclosure relates to an atomic force microscope equipped with an optical measurement device and a method of acquiring information on a surface of a measurement target using the same, and more particularly, to an atomic force microscope equipped with an optical measurement device and a method of acquiring information on a surface of a measurement target using the same, in which the optical measurement device acquires shape information based on a characteristic value extracted from shape information acquired by the atomic force microscope.

Description of the Related Art

An optical measurement device refers to a measurement device based on scatterometry or an optical critical dimension (OCD) technology that establishes a simulation model in respect to a repetitive structure (lattice) on a surface of a measurement target and fits the simulation model established depending on measurement results measured using optical characteristics such as diffraction, polarization, and the like.

Recently, the optical measurement device is sometimes used for an aperiodic structure as well as the repetitive structure by using machine learning methodology. Of course, the use of the machine learning methodology is also used for the repetitive structure (periodic structure).

The optical measurement device is advantageous in that the optical measurement device performs the high-speed measurement and is excellent in reproducibility despite the repetitive measurement. However, the optical measurement device has drawbacks in that a long setting-up time is required before performing the measurement, and a large number of parameters are needed to measure a structure with a complicated shape, which complicates fitting calculation and makes it difficult to acquire an accurate shape.

To solve the drawbacks of the optical measurement device, an additional measurement device such as a CD-SEM may be used. However, accuracy of the CD-SEM is insufficient to solve the drawbacks of the optical measurement device.

SUMMARY

An object to be achieved by the present disclosure is to provide an atomic force microscope equipped with an optical measurement device and a method of acquiring shape information on a surface of a measurement target using the same, in which the optical measurement device acquires shape information based on a characteristic value extracted from shape information acquired by the atomic force microscope.

Technical problems of the present disclosure are not limited to the aforementioned technical problem, and other technical problems, which are not mentioned above, may be clearly understood by those skilled in the art from the following descriptions.

According to an aspect of the present disclosure, an atomic force microscope equipped with an optical measurement device, which acquires characteristics of a surface of a measurement target by moving a probe along the surface of the measurement target while scanning the measurement target on an XY plane using an XY scanner for supporting the measurement target, includes: an optical measurement device including a lighting unit configured to allow light to enter the surface of the measurement target, and a detection unit configured to detect light reflected by the surface of the measurement target, the optical measurement device being configured to acquire the characteristics of the surface of the measurement target by the scanning by the XY scanner; and a control device configured to control an operation of the atomic force microscope and an operation of the optical measurement device and receive data acquired from the atomic force microscope and the optical measurement device. The control device controls and matches a position measured by the atomic force microscope with a position measured by the optical measurement device.

The lighting unit may allow the light to enter a portion in the vicinity of the probe.

The lighting unit may allow the light to obliquely enter the surface of the measurement target so that the probe is positioned between the lighting unit and the detection unit.

The lighting unit may allow the light to vertically enter the surface of the measurement target from above the probe.

The position measured by the atomic force microscope may be coincident with the position measured by the optical measurement device by moving the probe relative to the surface of the measurement target or moving the optical measurement device relative to the surface of the measurement target.

The atomic force microscope and the optical measurement device may be disposed such that an offset occurs between the position measured by the atomic force microscope and the position measured by the optical measurement device.

According to another aspect of the present disclosure, a method of acquiring information on a surface of a measurement target using the above-mentioned atomic force microscope equipped with the optical measurement device includes: an atomic force microscope measurement step of acquiring shape information on a specific point on the surface of the measurement target using the atomic force microscope; a step of extracting a characteristic value related to a shape depending on the shape information on the specific point acquired by the atomic force microscope measurement step; and an optical measurement step of acquiring shape information on an area including the specific point on the surface of the measurement target using the optical measurement device depending on the characteristic value.

The characteristic value may be at least one of a height, a top width, a bottom width, a radius of an edge, surface roughness, a period, and a sidewall angle (SWA).

According to still another aspect of the present disclosure, a method of acquiring information on a surface of a measurement target using the above-mentioned atomic force microscope equipped with the optical measurement device includes: measuring a specific area by the optical measurement device; and measuring a partial area by the atomic force microscope depending on measurement data made by the optical measurement device.

According to yet another aspect of the present disclosure, a method of acquiring information on a surface of a measurement target using the above-mentioned atomic force microscope equipped with the optical measurement device includes: positioning the probe of the atomic force microscope adjacent to the surface of the measurement target; generating localized surface plasmon resonance by emitting light to a portion between the probe and the surface of the measurement target using the lighting unit of the optical measurement device; acquiring information on the measurement target from the probe that interacts with an electric field generated by the localized surface plasmon resonance; and acquiring a signal including an at least amplified Raman spectrum signal from the detection unit of the optical measurement device, in which the probe is coated with metal.

The positioning of the probe adjacent to the surface of the measurement target may include positioning the probe adjacent to the surface of the measurement target in a non-contact mode.

The acquiring of the signal may further include acquiring a signal related to an absorption spectrum.

According to the atomic force microscope equipped with the optical measurement device and the method of acquiring shape information on a surface of a measurement target using the same according to the present disclosure, it is possible to acquire the shape data of the accurate profile within a short time by solving a problem of the long measurement time of the atomic force microscope and a problem of incorrect fitting of the complicated shape of the optical measurement device. In addition, the optical measurement device is integrally mounted on the atomic force microscope, which makes it easy to combine the data acquired by the atomic force microscope and the data acquired by the optical measurement device. In addition, only the required part is measured by the atomic force microscope depending on the measurement data made by the optical measurement device, which makes it possible to improve the overall measurement speed. In addition, the optical measurement device and the atomic force microscope are integrated, which makes it possible to reduce costs such as investment costs, maintenance costs, and personnel expenses in the company that manufactures components such as semiconductors and display frequently using both the two measurement devices.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
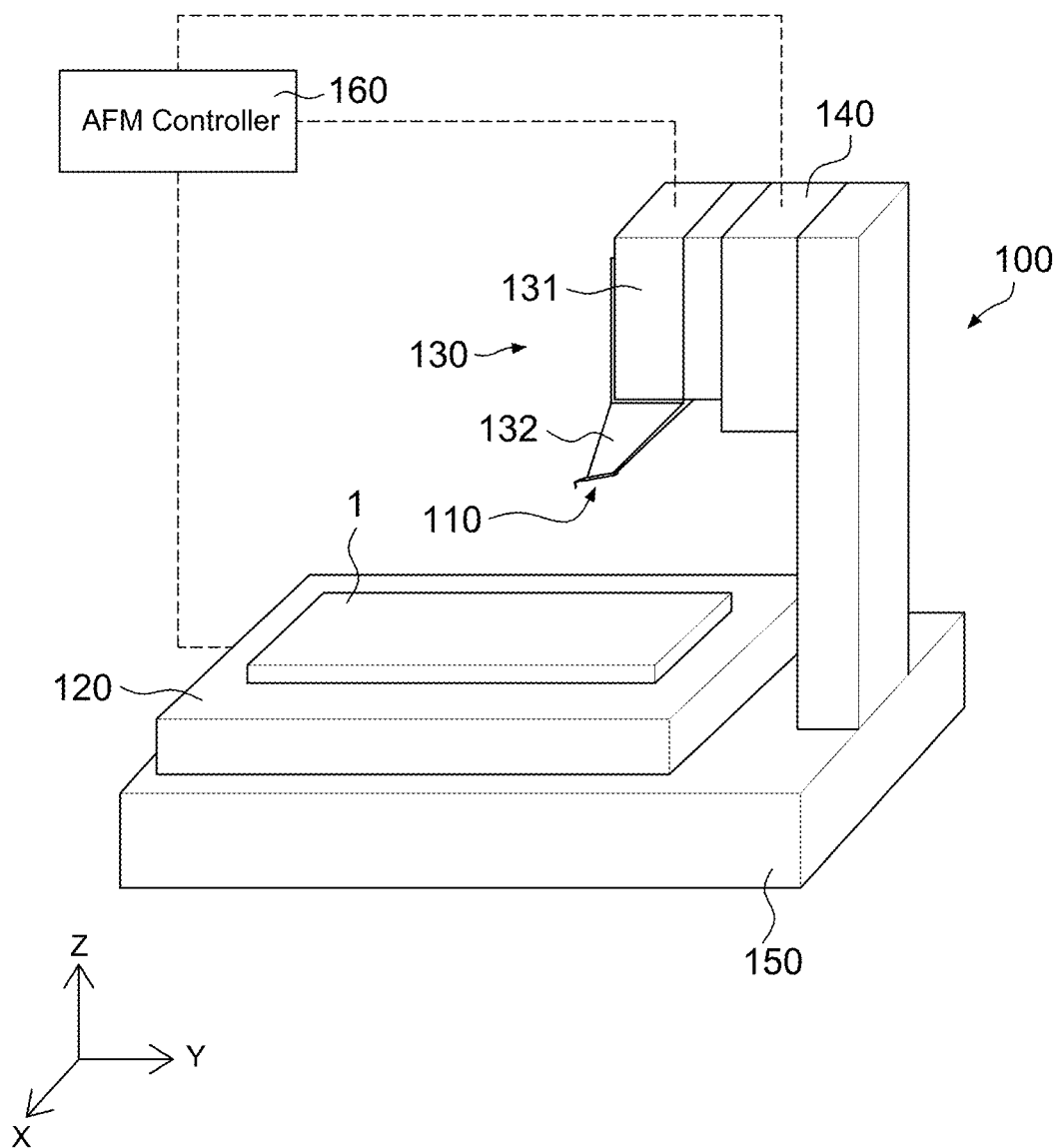
FIG. 1 is a schematic perspective view illustrating an atomic force microscope in which an XY scanner and a Z scanner are separated.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims.

Terms "first", "second", and the like may be used to describe various constituent elements, but the constituent elements are of course not limited by these terms. These terms are merely used to distinguish one constituent element from another constituent element. Therefore, the first constituent element mentioned hereinafter may of course be the second constituent element within the technical spirit of the present disclosure. In addition, even if it is described that second coating is performed after first coating, it is obvious that the feature in which the coating is performed in the reverse order is also included in the technical spirit of the present disclosure.

In using reference numerals in the present specification, like reference numerals are used, if possible, when like configurations are illustrated even though the drawings are different.

The size and thickness of each component illustrated in the drawings are shown for ease of description, but the present disclosure is not necessarily limited to the size and thickness of the illustrated component.

Configuration of Atomic Force Microscope

First, a configuration of an atomic force microscope equipped with no optical measurement device will be described.

Figure 2:
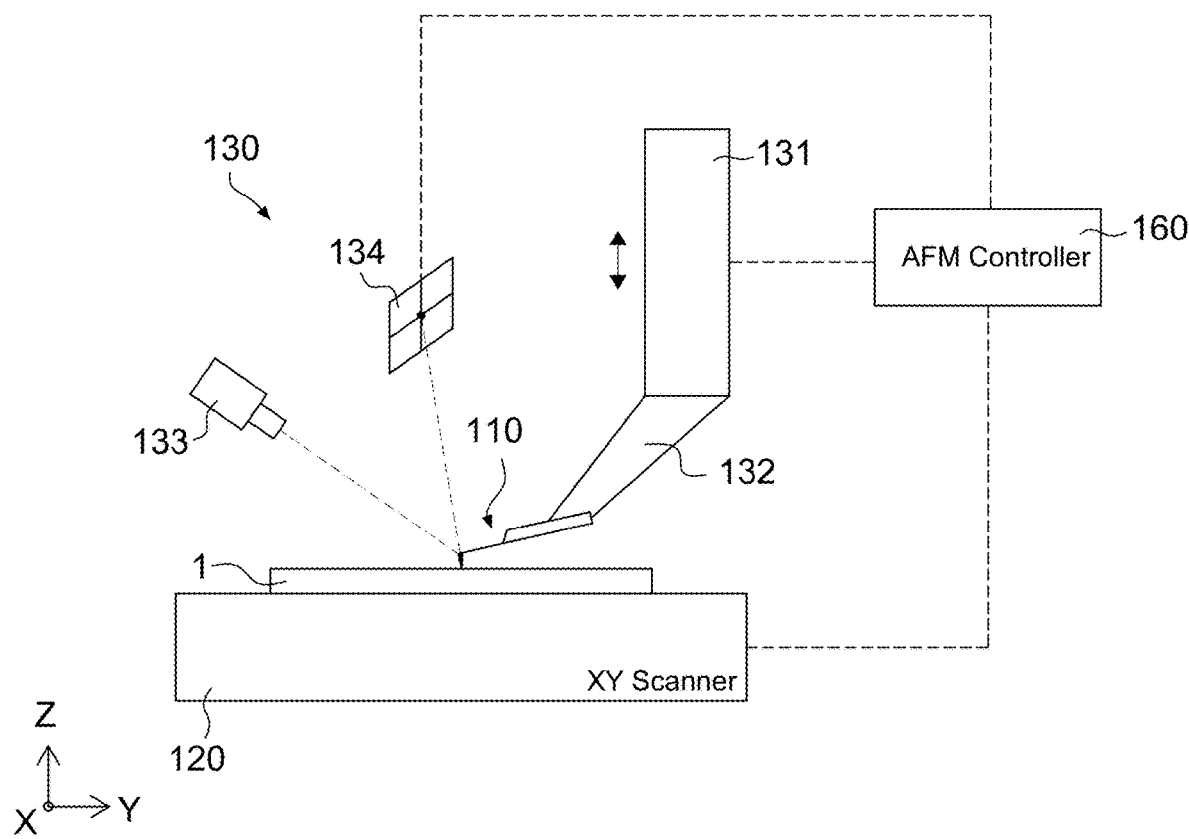
FIG. 2 is a conceptual view for explaining a method of measuring a measurement target using an optical system.

FIG. 1 is a schematic perspective view illustrating the atomic force microscope in which an XY scanner and a Z scanner are separated, and FIG. 2 is a conceptual view for explaining a method of measuring a measurement target using an optical system.

Referring to FIG. 1, an atomic force microscope 100 includes a probe 110, an XY scanner 120, a head 130, a Z stage 140, a fixing frame 150, and a controller 160.

The probe 110 has a tip and a cantilever, and the tip of the probe 110 moves along a surface of a measurement target 1 in a contact or non-contact manner. Various shapes used for the atomic force microscopes may be freely applied to the probe 110.

The XY scanner 120 is configured to move the measurement target 1 so that the tip of the probe 110 moves at least in a first direction relative to the surface of the measurement target 1. Specifically, the XY scanner 120 serves to scan the measurement target 1 in an X direction and a Y direction on an XY plane.

The head 130 is configured such that the probe 110 is mounted thereon. The head 130 includes an optical system configured to measure vibration or bending of the cantilever, and a Z scanner 131 configured to move the probe 110 at least in a second direction and a direction opposite to the second direction to control a distance between the tip and the surface of the measurement target depending on data acquired by the optical system. The optical system will be described below with reference to FIG. 2. In this case, the Z scanner 131 moves the probe 110 with a comparatively small displacement.

The Z stage 140 moves the probe 110 and the head 130 with a relatively large displacement in a Z direction.

The fixing frame 150 fixes the XY scanner 120 and the Z stage 140.

The controller 160 is configured to at least control the XY scanner 120, the head 130, and the Z stage 140. The controller 160 may be a control device itself, which will be described below, or included in a separate control device.

Meanwhile, the atomic force microscope 110 may further include a non-illustrated XY stage configured to move the XY scanner 120 with a large displacement on the XY plane. In this case, the XY stage is fixed to the fixing frame 150.

The atomic force microscope 100 acquires a topographic image by scanning the surface of the measurement target 1 using the probe 110. A relative movement between the surface of the measurement target 1 and the probe 110 may be performed by the XY scanner 120, and the upward or downward movement of the probe 110 along the surface of the measurement target 1 may be performed by the Z scanner 131. Meanwhile, the probe 110 and the Z scanner 131 are connected by means of a probe arm 132.

Referring to FIG. 2, the XY scanner 120 supports the measurement target 1 and scans the measurement target 1 in an XY direction. For example, the operation of the XY scanner 120 may be implemented by a piezoelectric actuator. In a case in which the Z scanner 131 is separated from the XY scanner 120, like the present embodiment, a stacked piezoelectric driver may be used. The XY scanner 120 may be described with reference to Korean Patent No. 10-0523031 (entitled 'XY SCANNER FOR SCANNING PROBE MICROSCOPE AND METHOD OF OPERATING THE SAME') and Korean Patent No. 10-1468061 (entitled 'METHOD OF CONTROLLING SCANNER AND SCANNER DEVICE USING THE SAME'), the proprietor of which is the present applicant.

The Z scanner 131 may be connected to the probe 110 and adjust a height of the probe 110. Like the XY scanner 120, the operation of the Z scanner 131 may also be performed by the piezoelectric actuator. The Z scanner 131 may be described with reference to Korean Patent No. 10-1476808 (entitled 'SCANNER DEVICE AND ATOMIC FORCE MICROSCOPE INCLUDING THE SAME'), the proprietor of which is the present applicant. The probe 110 moves away from the surface of the measurement target 1 when the Z scanner 131 is retracted, and the probe 110 moves toward the surface of the measurement target 1 when the Z scanner 131 is extended.

As illustrated in FIGS. 1 and 2, the XY scanner 120 and the Z scanner 131 are separated and provided as separate members, such that the measurement operation of the optical measurement device may be performed as the XY scanner 120 scans the measurement target 1.

The head 130 has the optical system capable of measuring vibration or bending of the cantilever of the probe 110. The optical system includes a laser beam generating unit 133 and a detector 134.

The laser beam generating unit 133 emits laser beams (indicated by dotted lines) to the surface of the cantilever of the probe 110, and the laser beams reflected by the surface of the cantilever are focused on the two-axis detector 134 such as a position sensitive photo detector (PSPD). A signal detected by the detector 134 is transmitted to the controller 160 for control.

The AFM controller 160 is connected to the XY scanner 120 and the Z scanner 131 and controls the operation of the XY scanner 120 and the operation of the Z scanner 131. In addition, the AFM controller 160 may convert a signal, acquired from the detector 134, into a digital signal by the ADC converter and determine a degree of bending, warping, or the like of the cantilever of the probe 110 depending on the digital signal. The AFM controller 160 may be integrated with a computer. Alternatively, the controller 160 may be connected to a separate computer. The AFM controller 160 may be integrated as one piece and then accommodated in a rack. However, the AFM controller 160 may be divided into two or more pieces.

The AFM controller 160 transmits a signal for operating the XY scanner 120 so that the XY scanner 120 may scan the measurement target 1 in the XY direction. Further, the AFM controller 160 controls the Z scanner 131 so that the probe 110 has a predetermined interaction force with the surface of the measurement target 1 (i.e., the cantilever maintains a predetermined degree of force or the cantilever vibrates with a predetermined amplitude). That is, the AFM controller 160 has software or electric-circuit closed-loop feedback logic. In addition, the controller 160 acquires shape data (topography) related to the surface of the measurement target 1 by measuring a length of the Z scanner 131 (or a length of the actuator used for the Z scanner 131 or measuring the voltage applied to the actuator used for the Z scanner 131.

In this case, the tip of the probe 110 may move relative to the surface of the measurement target 1 in a state in which the tip of the probe 110 is in contact with the surface of the measurement target 1 (referred to as a 'contact mode'). Further, the tip of the probe 110 may move relative to the surface of the measurement target 1 while vibrating in a state in which the tip of the probe 110 is not in contact with the surface of the measurement target 1 (referred to as a 'non-contact mode'). Further, the tip of the probe 110 may move relative to the surface of the measurement target 1 while vibrating and tapping the surface of the measurement target 1 (referred to as a 'tapping mode'). Because these various modes have been developed in the related art, a detailed description thereof will be omitted.

Meanwhile, in addition to the shape data, the AFM controller 160 may acquire various data related to the surface of the measurement target 1. For example, special treatment may be performed on the probe 110 so that the probe 110 has a magnetic force or receives an electrostatic force, and the AFM controller 160 may acquire data related to the magnetic force of the surface of the measurement target 1 and data related to the electrostatic force. The modes of the atomic force microscope may include magnetic force microscopy (MFM), electrostatic force microscopy (EFM), and the like and be implemented using well-known methods. Further, the data related to the surface of the measurement target 1 may include the voltage of the surface, the current of the surface, or the like.

Meanwhile, only the essential constituent elements of the head 130 are described for the convenience of description. However, it should be noted that specific components of the optical system are omitted. For example, the head 130 may further include the components disclosed in Korean Patent No. 10-0646441.

Configuration of Atomic Force Microscope Including Optical Measurement Device

Hereinafter, embodiments of the atomic force microscope including the optical measurement device according to the present disclosure will be described with reference to the accompanying drawings.

Figure 3:
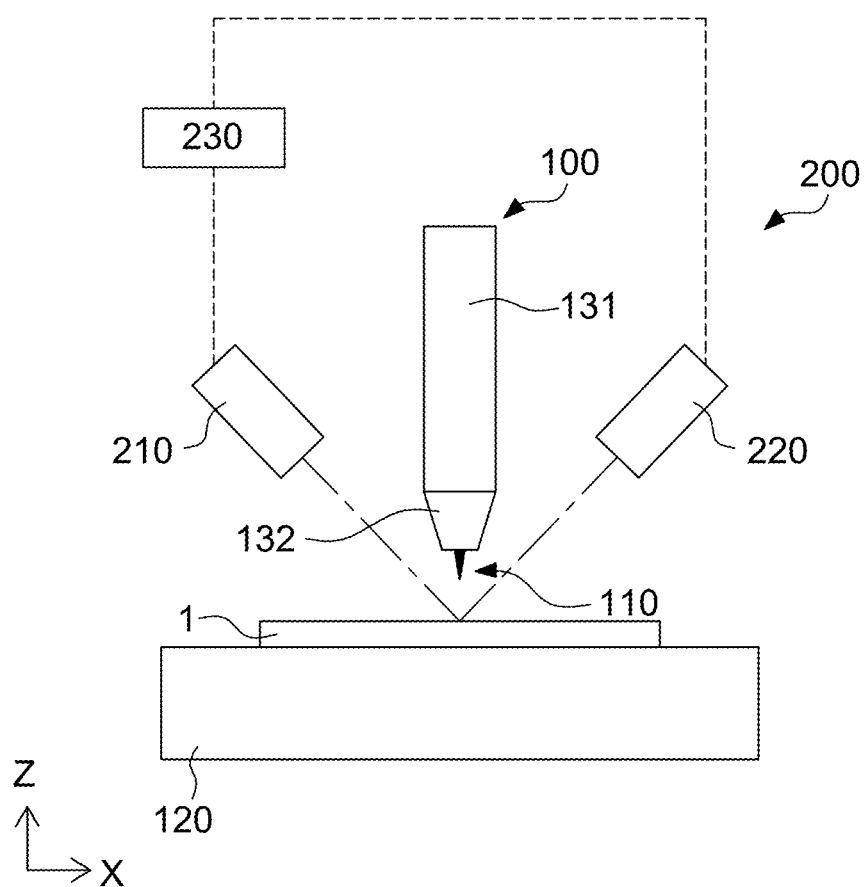
FIG. 3 is a schematic conceptual view illustrating an atomic force microscope including an optical measurement device according to an embodiment of the present disclosure when viewed from the front side.
Figure 4:
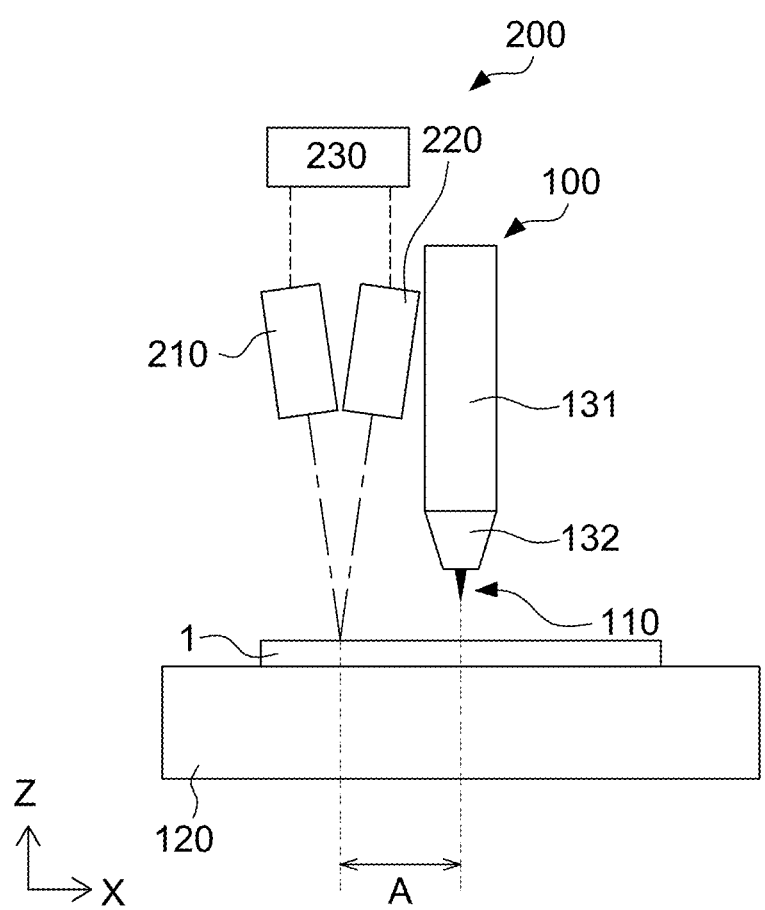
FIG. 4 is a schematic conceptual view illustrating an atomic force microscope including an optical measurement device according to another embodiment of the present disclosure when viewed from the front side.

FIG. 3 is a schematic conceptual view illustrating the atomic force microscope including the optical measurement device according to the embodiment of the present disclosure when viewed from the front side, and FIG. 4 is a schematic conceptual view illustrating an atomic force microscope including an optical measurement device according to another embodiment of the present disclosure.

For reference, FIGS. 3 and 4 are views illustrating the atomic force microscope including the optical measurement device according to the present disclosure when viewed in a Y direction in FIG. 1.

Referring to FIG. 3, the optical measurement device 200 includes a lighting unit 210, a detection unit 220, and an optical controller 230. For example, the optical measurement device 200 may be a scatterometer. The present disclosure is not limited to a method of measuring an area and a method of measuring a spot. For example, a spectroscopic ellipsometer may also be used as the optical measurement device 200.

The lighting unit 210 is configured to generate light and emit the light to the measurement target 1. Although not illustrated, the lighting unit 210 may include a light source, a polarization/phase adjusting unit, and a lens. That is, the lighting unit 210 generates light from the light source, adjusts polarization or phase of the light, produces desired beams using the lens, and emit the light to the measurement target 1.

The light source of the lighting unit 210 may be appropriately selected depending on the measurement methods. However, for example, in the case of the spectroscopic ellipsometer, the light source may be configured to generate light in a selected wavelength range (e.g., 100 to 2,500 nm).

Meanwhile, the lighting unit 210 may be configured such that the light in the form of a spot enters the measurement target 1 or the light enters the measurement target 1 while forming an area.

The detection unit 220 is configured to receive the light reflected by the surface of the measurement target 1. Although not illustrated, the detection unit 220 may include a polarization/phase adjusting unit and a slitting unit. The detection unit 220 transmit information on the detected light to the optical controller 230.

The optical controller 230 fits a shape of a structure of the surface of the measurement target 1 depending on the data acquired by the detection unit 220. The optical controller 230 may include a computing system. The optical controller 230 may be integrated with the AFM controller 160 and thus be collectively called a control device.

Further, as the optical measurement device using the lighting unit 210 and the detection unit 220, an optical reflectometer, a spectroscopic scatterometer, an overlay scatterometer, an angle resolved beam profile reflectometer, a polarization-resolved beam profile reflectometer, a beam profile reflectometer, a beam profile ellipsometer, an angle or multi-wavelength ellipsometer, and the like may be applied in a non-restrictive manner.

The lighting unit 210 allows the light to obliquely enter the surface of the measurement target 1 so that the probe 110 is positioned between the lighting unit 210 and the detection unit 220. That is, the position measured by the optical measurement device 200 is set to be close to a position measured by the atomic force microscope 100.

However, the lighting unit 210 need not be necessarily configured to allow the light to obliquely enter the surface of the measurement target 1. For example, the optical measurement device may be configured such that the lighting unit 210 allows the light to vertically enter the surface of the measurement target 1 from above the probe 110.

More particularly, the position measured by the optical measurement device 200 may be coincident with the position measured by the atomic force microscope 100. This coincidence may be achieved by moving the probe 110 relative to the surface of the measurement target 1 or moving the optical measurement device 200 relative to the surface of the measurement target 1.

For example, although not illustrated, the atomic force microscope 100 includes an optical microscope to observe the probe 110 from above. A position of the probe 110 may be specified by the optical microscope. An incident angle and position of the lighting unit 210 are adjusted so that the light is focused on the position of the probe 110. A position of the detection unit 220 is adjusted so that the detection unit 220 receives the reflected light from the surface of the measurement target 1. As a result, the position measured by the optical measurement device 200 may be coincident with the position measured by the atomic force microscope 100.

The incident angle of the light with respect to the surface of the measurement target 1 from the lighting unit 210 may be variously set, and the lighting unit 210 may be configured to adjust the incident angle.

Meanwhile, unlike FIG. 3, the atomic force microscope 100 and the optical measurement device 200 may be disposed, as illustrated in FIG. 4, so that an offset A may occur between the position measured by the atomic force microscope 100 and the position measured by the optical measurement device 200.

As illustrated in FIG. 4, when the optical measurement device 200 is installed in the atomic force microscope 100 so that the offset A occurs, the incident angle made by the lighting unit 210 may be variously set. The optical measurement device 200 may be installed so that the light vertically enters the surface of the measurement target 1. In the case in which the light vertically enters the surface of the measurement target 1, the lighting unit 210 and the detection unit 220 may be configured as a single member.

The control device (not illustrated) includes the AFM controller 160 and the optical controller 230, controls the operation of the atomic force microscope 100 and the operation of the optical measurement device 200, and receives data acquired from the atomic force microscope 100 and the optical measurement device 200.

The control device may match the position measured by the atomic force microscope 100 with the position measured by the optical measurement device 200. For example, as illustrated in FIG. 3, the control device may control and move the atomic force microscope 100 or the optical measurement device 200 to physically match the position measured by the atomic force microscope 100 with the position measured by the optical measurement device 200. In addition, for example, as illustrated in FIG. 4, the control device may match, after the measurement, the data acquired by the measurement made by the atomic force microscope 100 and the optical measurement device 200 at physically different measurement positions in consideration of the offset A. That is, the matching may be physical matching or data matching implemented after the measurement in consideration of a physical distance.

Figure 5:
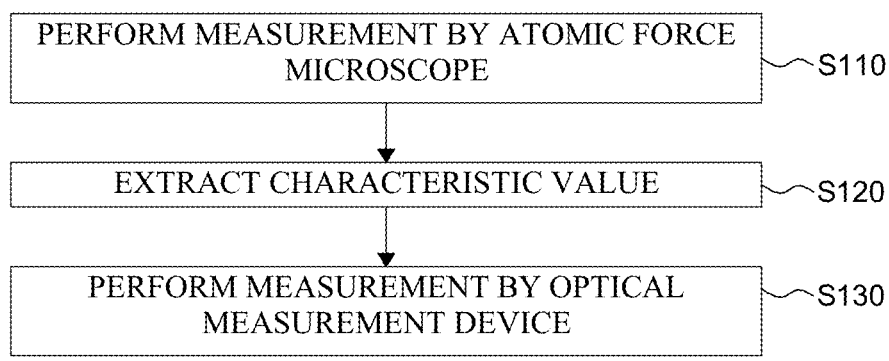
FIG. 5 is a flowchart sequentially illustrating a method of acquiring shape information on a surface of a measurement target using the atomic force microscope equipped with the optical measurement device illustrated in FIG. 3 or 4.
Figure 6:
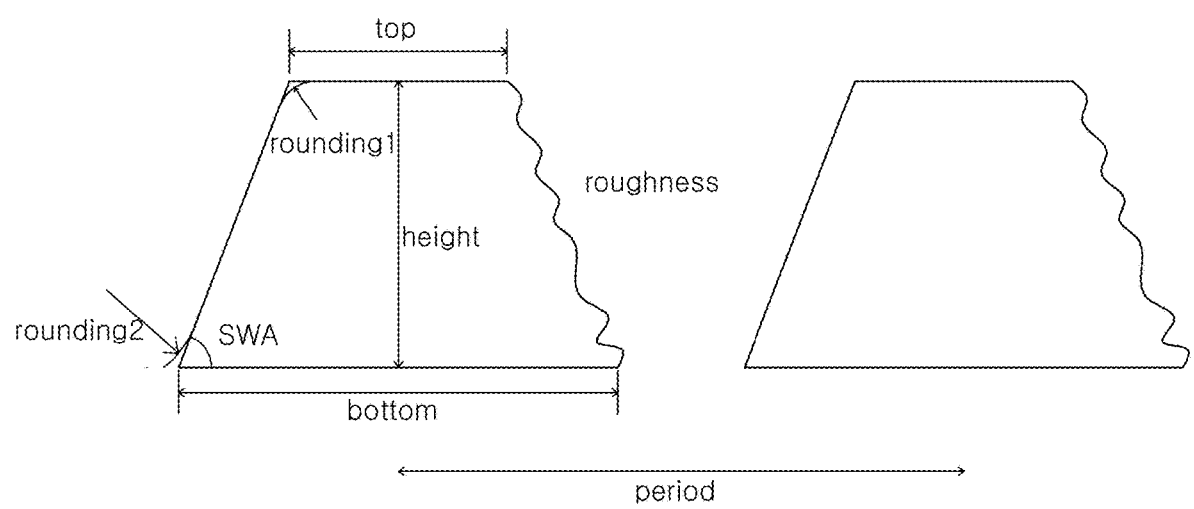
FIG. 6 is a conceptual view illustrating an example of a characteristic value.

Method of Acquiring Shape Information on Surface of Measurement Target Using Atomic Force Microscope Including Optical Measurement Device FIG. 5 is a flowchart sequentially illustrating a method of acquiring shape information on a surface of a measurement target using the atomic force microscope equipped with the optical measurement device illustrated in FIG. 3 or 4, and FIG. 6 is a conceptual view illustrating an example of a characteristic value.

First, in an atomic force microscope measurement step S110, the atomic force microscope 100 is used to acquire shape information on a specific point on the surface of the measurement target 1. In this case, the specific point may be one structure of a repetitive pattern.

Thereafter, in an atomic force microscope measurement step S110, a characteristic value related to a shape is extracted based on the shape information on the specific point (S120). Referring to FIG. 6, the characteristic value related to the shape may be at least one of a height (height), a top width (top), a bottom width (bottom), a rounding radius of an edge (rounding 1 and rounding 2), a surface roughness (roughness), a period (period), and a sidewall angle (SWA).

In an optical measurement step S130, shape information on an area including the specific point on the surface of the measurement target 1 is acquired using the optical measurement device 200 depending on the characteristic value. In this case, the measurement is performed by scanning the measurement target 1 using the XY scanner 120 of the atomic force microscope 100.

Figure 7A:
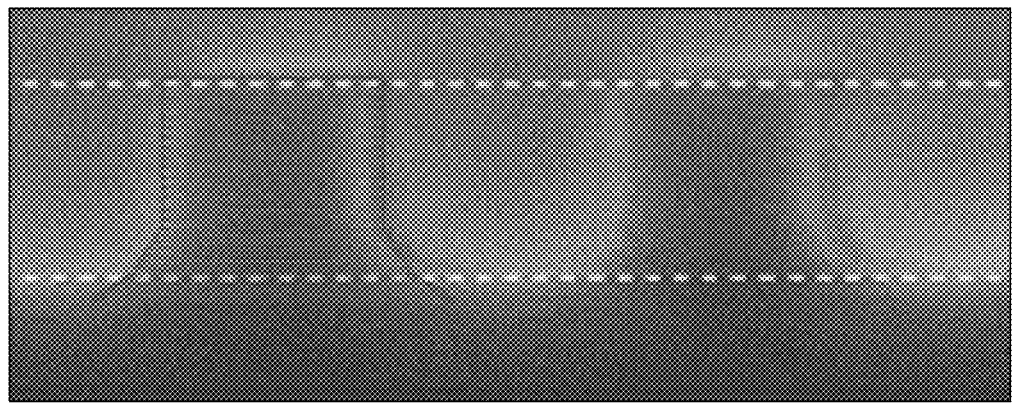
FIG. 7A is an image of a physical model created using a CD-SEM.
Figure 7B:
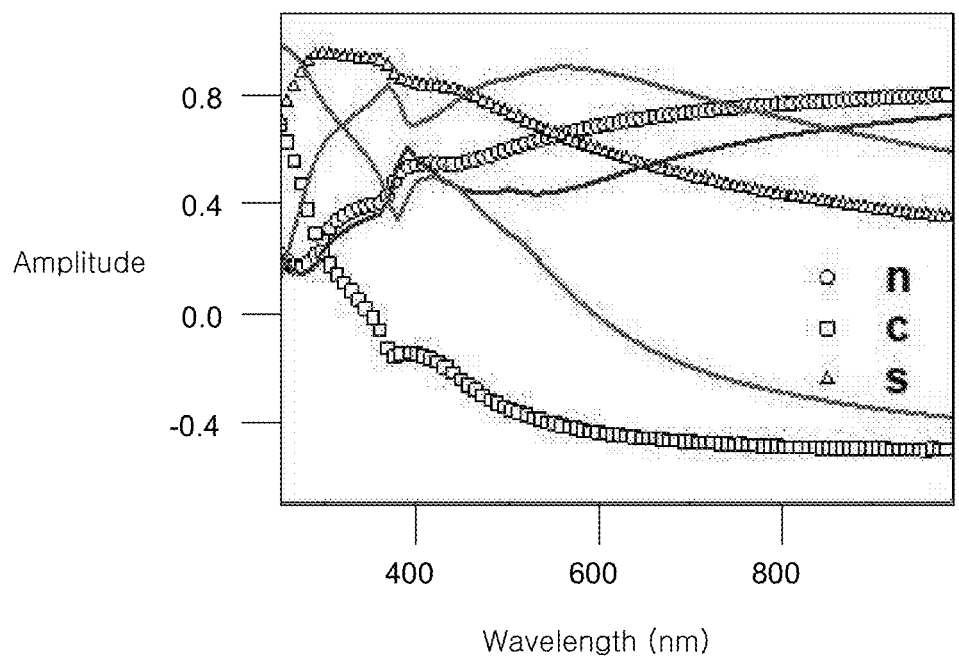
FIG. 7B is a graph of a spectrum measured using characteristic values from the physical model.
Figure 8A:
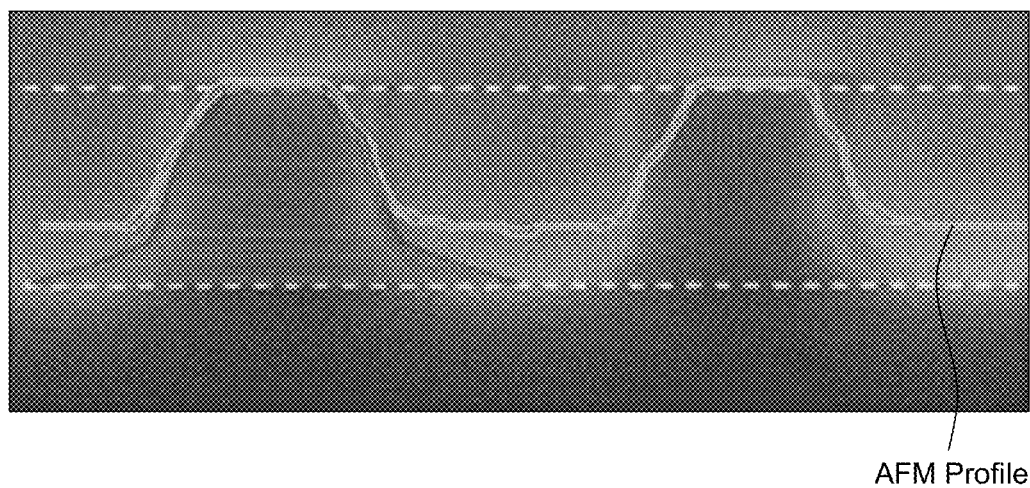
FIG. 8A is an image of a physical model created using an atomic force microscope.
Figure 8B:
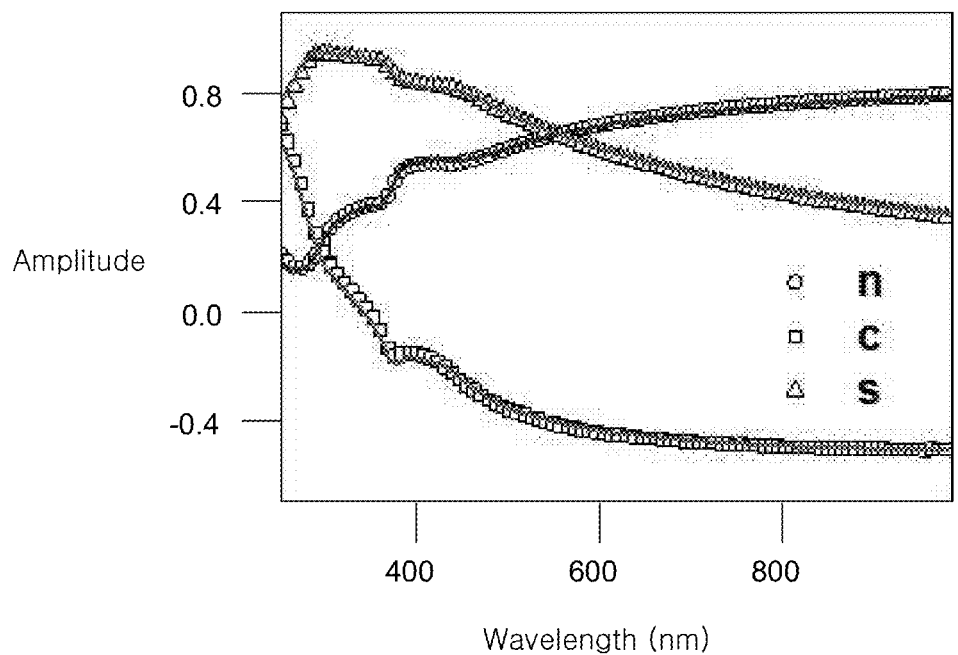
FIG. 8B is a graph of a spectrum measured using characteristic values from the physical model.

FIG. 7A is an image of a physical model created using a CD-SEM, FIG. 7B is a graph of a spectrum measured using characteristic values from the physical model, FIG. 8A is an image of a physical model created using an atomic force microscope, and FIG. 8B is a graph of a spectrum measured using characteristic values from the physical model.

First, referring to FIG. 7A, when a physical model having a repetitive structure is formed by applying discretization in a height direction, a physical model having a unit pattern having an external shape defined by the blue line is defined in consideration of the image made by the CD-SEM. When optical critical dimension (OCD) methodology is applied using the unit pattern of the physical model, the n spectrum, the c spectrum, and the s spectrum (respectively indicated by the blue, red, and green solid lines), which are actually measured, are greatly different from theoretical values (or simulation values) (illustrated as a hollow circular, quadrangular, and triangular shapes), as illustrated in FIG. 7B. That is, this result shows that the modeling is incorrectly set.

Meanwhile, in the present embodiment, n, c, and s are described as measured values, for example. However, the present disclosure is not limited thereto, and other measured values may be used. For example, Psi or delta may be used, or a Mueller matrix value may be used.

The incorrect modeling may be caused by various factors. For example, the incorrect modeling may be caused by the measurement error of the CD-SEM. Further, the incorrect modeling may be caused by a difference between the point measured by the CD-SEM and the point measured by the optical measurement device. Of course, the two factors may complexly act.

Because it is difficult to match the point measured by the CD-SEM and the point measured by the optical measurement device, the incorrect modeling illustrated in FIG. 6 may be easily caused.

This problem may be solved by applying a structure, like the device according to the present disclosure, which is capable of easily matching the measured points as the measurement by the atomic force microscope 100 and the measurement by the optical measurement device 200 are performed by the XY scanner 120 of the atomic force microscope 100.

Referring to FIG. 8A, a physical model (indicated by the blue solid line along which discretization is applied in the height direction) formed depending on profile shape data (indicated by the sky-blue solid line) acquired by the atomic force microscope 100 has a shape somewhat different from a shape illustrated in FIG. 7A.

It can be seen that the n spectrum, the c spectrum, and the s spectrum measured by the physical model are accurately coincident with the theoretical values, as illustrated in FIG. 8B.

Meanwhile, even in this case, n, c, and s are described as measured values, for example. However, the present disclosure is not limited thereto, and other measured values may be used. For example, Psi or delta may be used, or a Mueller matrix value may be used.

In addition, the difference between FIGS. 7 and 8 is that the physical shape having the pattern more accurate than that of the CD-SEM may be acquired by using the atomic force microscope 100 as the modeling shape is applied to the OCD methodology at accurately the same position by controlling the XY scanner 120.

When the OCD methodology is applied by the reliable characteristic value, it is possible to reduce the number of variables to be measured and thus to improve precision and repeatability related to the prediction of the application of the OCD methodology.

Figure 9:
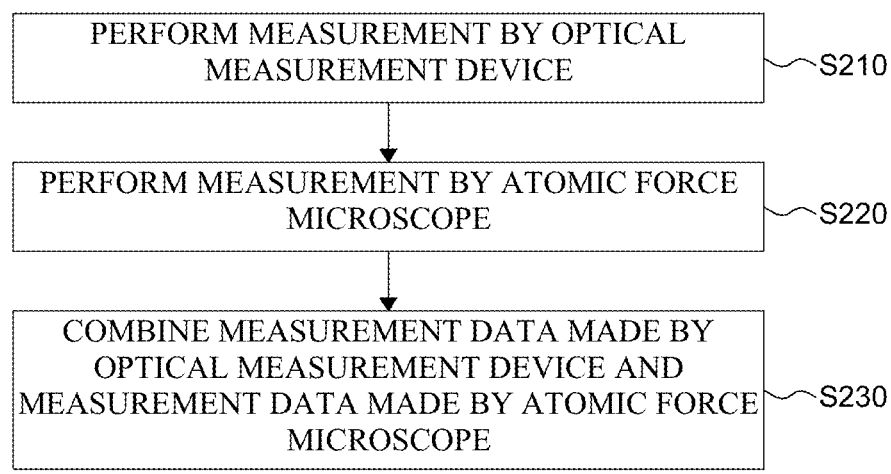
FIG. 9 is a flowchart sequentially illustrating a method of acquiring shape information on a surface of a measurement target, which is different from the method illustrated in FIG. 5.

FIG. 9 is a flowchart sequentially illustrating a method of acquiring shape information on a surface of a measurement target, which is different from the method illustrated in FIG. 5.

Referring to FIGS. 3, 4, and 9, it is possible to acquire the shape information on the surface of the measurement target by measuring a wide specific area first by the optical measurement device 200 (S210), measuring a partial area by the atomic force microscope 100 (S220), and combining measurement data made by the optical measurement device 200 and measurement data made by the atomic force microscope 100 (S230).

The partial area measured by the atomic force microscope 100 may be a part of the specific area measured by the optical measurement device 200 or may be an area that is not included in the specific area.

The partial area to be measured by the atomic force microscope 100 may be appropriately selected depending on characteristics of the measurement target 1. For example, a structure having a complex and distinctive shape may be selected. In addition, an area, which needs to be specially checked by the user, may be selected.

Because a measurement speed of the atomic force microscope 100 is relatively high, the optical measurement device 200 having a high measurement speed may quickly measure a wide area, the position of the structure having a complex shape is specified depending on the measurement data made by the optical measurement device 200, and the measurement is performed by the atomic force microscope 100 at this position, such that it is possible to achieve a high measurement speed while improving accuracy in a wide area.

Method of Measuring Physical Property of Measurement Target Depending on Localized Surface Plasmon Resonance (LSPR) Generation Principle The localized surface plasmon resonance refers to resonance made by surface plasmon caused by vibration of a group of electrons generated by an interaction between conduction electrons of metal and an electric field with a particular wavelength when the electric field is applied to a metal nanostructure having a size smaller than a wavelength of the light. The localized surface plasmon resonance is significantly affected by sizes, shapes, and arrangement of metal nanostructure, types of metal, and ambient environments FIG. 10 is a schematic conceptual view illustrating the atomic force microscope including the optical measurement device illustrated in FIG. 3, when viewed from the front side, which is manipulated to measure a physical property value by means of localized surface plasmon resonance.

The localized surface plasmon resonance may be induced by the configuration of the atomic force microscope including the optical measurement device illustrated in FIG. 3, and the characteristics of the measurement target may be recognized depending on the localized surface plasmon resonance.

Figure 10:
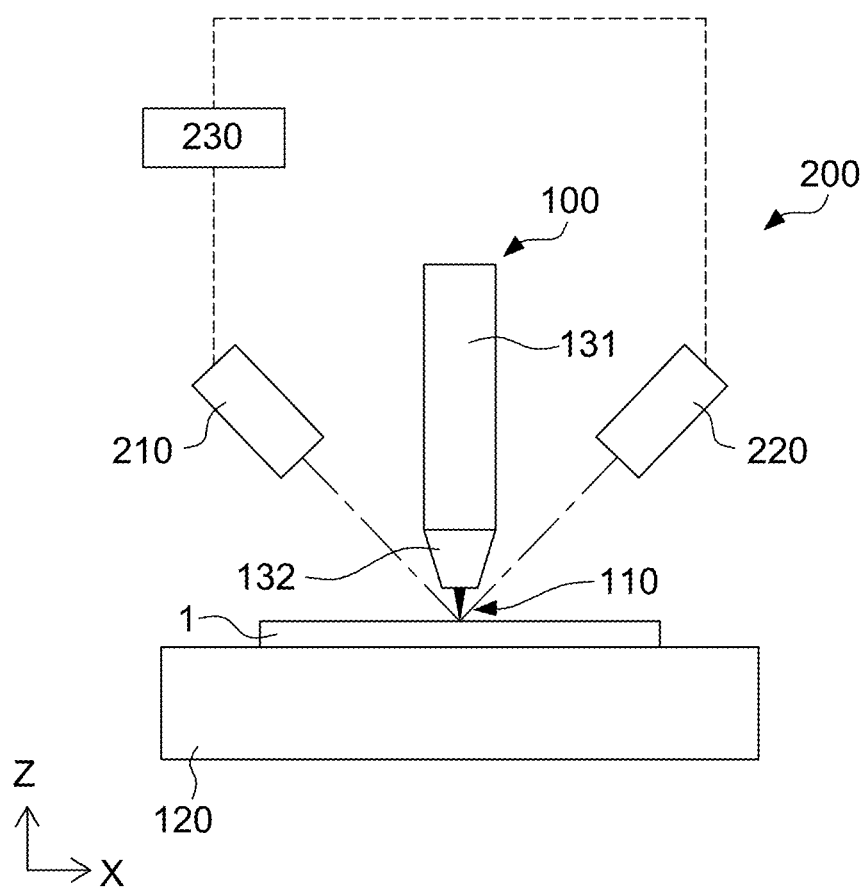
FIG. 10 is a schematic conceptual view illustrating the atomic force microscope including the optical measurement device illustrated in FIG. 3, when viewed from the front side, which is manipulated to measure a physical property value by means of localized surface plasmon resonance.

Referring to FIG. 10, unlike FIG. 3, the probe 110 is disposed to be very adjacent to the surface of the measurement target 1. The probe 110 may be close to the surface of the measurement target 1 to the extent that the probe 110 is affected by the electric field amplified by the localized surface plasmon resonance. For example, the probe 110 may be set to be in a state in which the probe 110 interacts with the surface of the measurement target 1 in the non-contact mode (generally referred to as 'approach state'). This utilizes the principle in which the electric field is measured in the non-contact mode in an electrostatic force microscopy (EFM) mode for measuring the electric field.

After the probe 110 approaches the surface of the measurement target 1 so as to measure the electric field, the light (e.g., laser beams) is emitted from the lighting unit 210 to a portion between the probe 110 and the surface of the measurement target 1. In this case, the probe 110 may be coated with metal such as gold to measure the electric field.

When the light is emitted, the localized surface plasmon resonance occurs between the probe 110 and the surface of the measurement target 1. Specifically, when the light is emitted from a laser or multi-wavelength light source to nano-sized metal nanoparticles, energy of the localized surface plasmon resonance is excited, and an electric field is induced within a predetermined range. The localized electric field is increased in the vicinity of the metal nanoparticles by the induced electric field. The localized electric field varies depending on the sizes, shapes, and arrangement of the metal nanoparticles.

The localized electric field affects the probe 110 and also affects the detection unit 220. That is, the localized electric field changes the behavior of the probe 110 to which bias voltage is applied, and the characteristics of the localized electric field may be measured using a EFM mode of a general atomic force microscope. Of course, topographic information may also be simultaneously acquired. Further, additional information may also be acquired by measuring the spectrum or intensity of the light reflected by the detection unit 220. In particular, because chemical properties of a sample are closely associated with an absorption spectrum of light, it is possible to know the type of material of the surface of the measurement target 1 by measuring the absorption spectrum made by the localized surface plasmon resonance. In addition, in consideration of the fact that there are spectrum components amplified by the localized surface plasmon resonance, a Raman spectrum signal associated with inherent properties of the material may be acquired by amplifying the spectrum components by means of the localized surface plasmon resonance. In other words, the detection unit 220 may measure the Raman spectrum amplified with the absorption spectrum caused by the inherent properties of the material of the surface of the measurement target 1. Therefore, it is possible to know the physical properties of the surface of the measurement target 1.

In this case, the localized electric field may be generated by the metal nanoparticle of the surface of the probe 110 and/or the metal nanoparticle of the surface of the measurement target 1.

Figure 11:
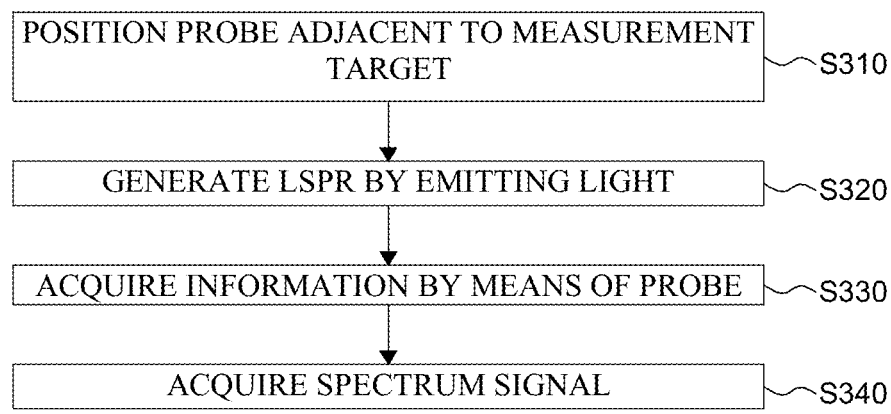
FIG. 11 is a flowchart illustrating a method of acquiring information on a surface of a measurement target using the device illustrated in FIG. 10.

FIG. 11 is a flowchart illustrating a method of acquiring information on a surface of a measurement target using the device illustrated in FIG. 10.

Referring to FIGS. 10 and 11, a method of acquiring information on a surface of a measurement target using the atomic force microscope equipped with the optical measurement device includes step S310 of positioning the probe 110 of the atomic force microscope adjacent to the surface of the measurement target 1, step S320 of generating the localized surface plasmon resonance (LSPR) by emitting light to a portion between the surface of the measurement target and the probe using the lighting unit 210 of the optical measurement device, step S330 of acquiring information on the measurement target from the probe that interacts with the electric field generated by the localized surface plasmon resonance, and step S340 of acquiring signals including an at least amplified Raman spectrum signal from the detection unit 220 of the optical measurement device.

Step S310 of positioning the probe of the atomic force microscope adjacent to the surface of the measurement target may include allowing the probe 110 to approach the surface of the measurement target in a non-contact mode. In addition, step S340 of acquiring the signal may further include acquiring a signal related to an absorption spectrum.

Of course, step S330 of acquiring the information from the probe 110 and step S340 of acquiring the signal from the detection unit 220 may be simultaneously performed.

The atomic force microscope including the optical measurement device using the localized surface plasmon resonance according to the present embodiment may be used to measure quality of a nanopattern formed or processed in a semiconductor manufacturing process, analyze defects of the nanopattern, measure properties of bio substances such as protein and cells, and measure properties of gases, environments, and chemical substances.

While the embodiments of the present disclosure have been described with reference to the accompanying drawings, those skilled in the art will understand that the present disclosure may be carried out in any other specific form without changing the technical spirit or an essential feature thereof. Therefore, it should be understood that the above-described embodiments are illustrative in all aspects and do not limit the present disclosure.

What is claimed is:

1. An atomic force microscope equipped with an optical measurement device, which acquires characteristics of a surface of a measurement target by moving a probe along the surface of the measurement target while scanning the measurement target on an XY plane using an XY scanner for supporting the measurement target, the atomic force microscope comprising:
   an optical measurement device comprising a lighting unit configured to allow light to enter the surface of the measurement target, and a detection unit configured to detect light reflected by the surface of the measurement target, the optical measurement device being configured to acquire the characteristics of the surface of the measurement target by the scanning by the XY scanner; and
   a control device configured to control an operation of the atomic force microscope and an operation of the optical measurement device and receive data acquired from the atomic force microscope and the optical measurement device,
   wherein the control device controls and matches a position measured by the atomic force microscope with a position measured by the optical measurement device.

2. The atomic force microscope of claim 1, wherein the lighting unit allows the light to enter a portion in the vicinity of the probe.

3. The atomic force microscope of claim 2, wherein the lighting unit allows the light to obliquely enter the surface of the measurement target so that the probe is positioned between the lighting unit and the detection unit.

4. A method of acquiring information on a surface of a measurement target using the atomic force microscope equipped with the optical measurement device according to claim 3, the method comprising:
   positioning the probe of the atomic force microscope adjacent to the surface of the measurement target;
   generating localized surface plasmon resonance by emitting light to a portion between the probe and the surface of the measurement target using the lighting unit of the optical measurement device;
   acquiring information on the measurement target from the probe that interacts with an electric field generated by the localized surface plasmon resonance; and
   acquiring a signal comprising an at least amplified Raman spectrum signal from the detection unit of the optical measurement device,
   wherein the probe is coated with metal.

5. The method of claim 4, wherein the positioning of the probe adjacent to the surface of the measurement target comprises positioning the probe adjacent to the surface of the measurement target in a non-contact mode.

6. The method of claim 4, wherein the acquiring of the signal further comprises acquiring a signal related to an absorption spectrum.

7. The atomic force microscope of claim 2, wherein the lighting unit allows the light to vertically enter the surface of the measurement target from above the probe.

8. The atomic force microscope of claim 2, wherein the position measured by the atomic force microscope is coincident with the position measured by the optical measurement device by moving the probe relative to the surface of the measurement target or moving the optical measurement device relative to the surface of the measurement target.

9. The atomic force microscope of claim 1, wherein the atomic force microscope and the optical measurement device are disposed such that an offset occurs between the position measured by the atomic force microscope and the position measured by the optical measurement device.

10. A method of acquiring information on a surface of a measurement target using the atomic force microscope equipped with the optical measurement device according to claim 1, the method comprising:
    an atomic force microscope measurement step of acquiring shape information on a specific point on the surface of the measurement target using the atomic force microscope;
    a step of extracting a characteristic value related to a shape depending on the shape information on the specific point acquired by the atomic force microscope measurement step; and
    an optical measurement step of acquiring shape information on an area including the specific point on the surface of the measurement target using the optical measurement device depending on the characteristic value.

11. The method of claim 10, wherein the characteristic value is at least one of a height, a top width, a bottom width, a radius of an edge, surface roughness, a period, and a sidewall angle (SWA).

12. A method of acquiring information on a surface of a measurement target using the atomic force microscope equipped with the optical measurement device according to claim 1, the method comprising:
    measuring a specific area by the optical measurement device; and
    measuring a partial area by the atomic force microscope depending on measurement data made by the optical measurement device.

* * * * *